Sept. 18, 1962

O. A. MEYKAR 3,054,933

RECTIFIER APPARATUS

Filed Oct. 6, 1959

2 Sheets-Sheet 1

WITNESSES

Edwin E. Bassler

James F. Young

INVENTOR

Orest A. Meykar

BY F. E. Browder

ATTORNEY

Sept. 18, 1962 O. A. MEYKAR 3,054,933
RECTIFIER APPARATUS
Filed Oct. 6, 1959 2 Sheets-Sheet 2
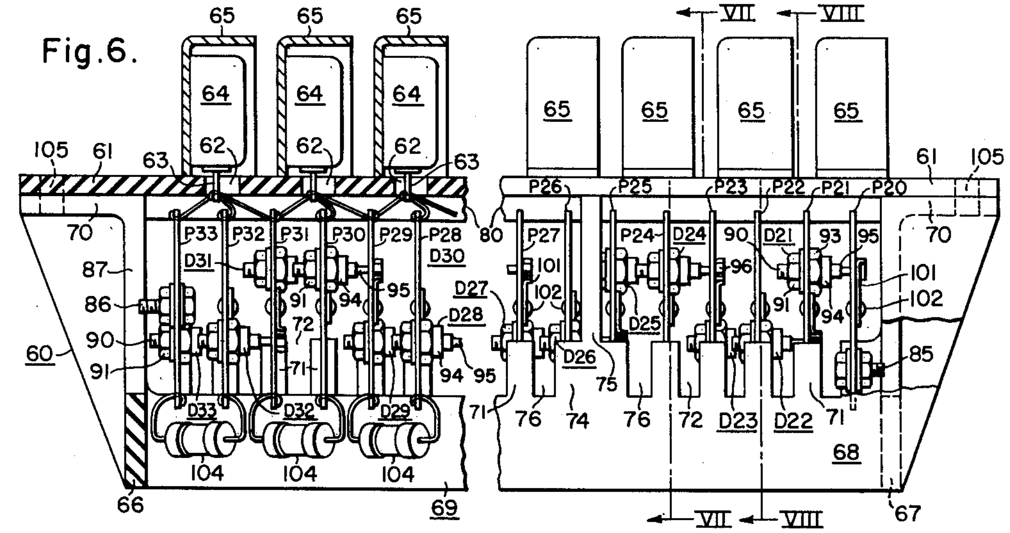
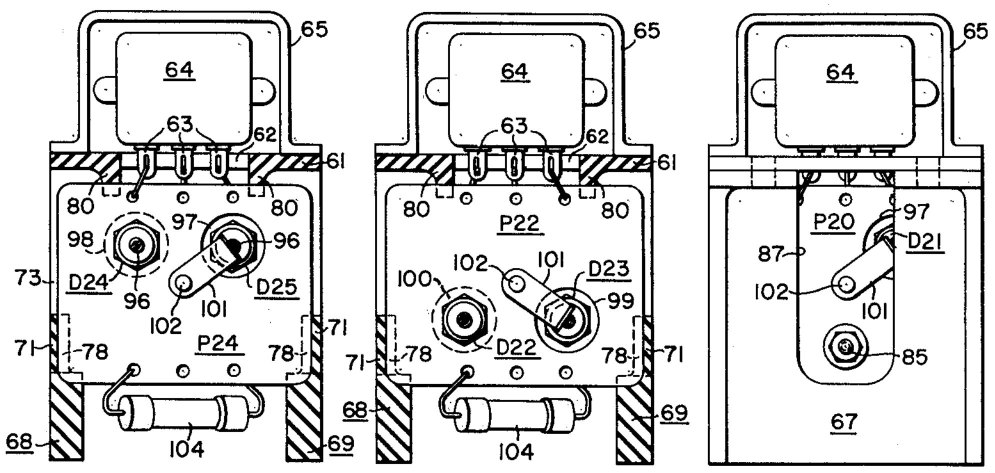
Fig.7. Fig.8. Fig.9.
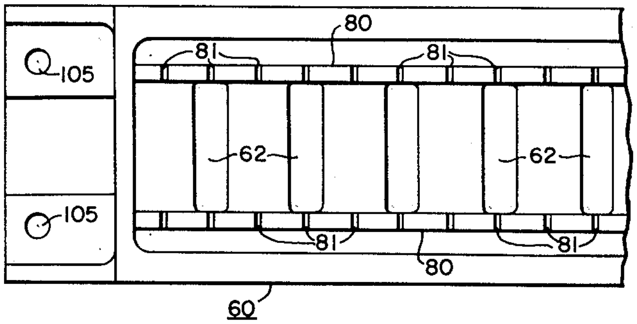
Fig.10.

United States Patent Office 3,054,933 Patented Sept. 18, 1962

3,054,933
RECTIFIER APPARATUS

Orest A. Meykar, Swarthmore, Pa., assignor to Westinghouse Electric Corporation, East Pittsburgh, Pa., a corporation of Pennsylvania Filed Oct. 6, 1959, Ser. No. 844,761
7 Claims. (Cl. 317—99)

This invention relates to air-cooled assemblies of series-connected, semiconductor rectifiers.

Semiconductor rectifiers such, for example, as silicon diodes, are often connected in series for rectifying high voltage alternating currents. To permit the highest possible current through the diodes within the limits of their ratings, it is important that they be so mounted that adequate electrical insulation is provided, and that the heat generated in them can be dissipated. For many applications, such assemblies must be air cooled.

A feature of this invention is that an assembly of series-connected diodes is provided in which each diode is mounted on a metal plate which forms an extended, heat dissipating surface in which a structural frame of electrical insulation supports the plates in parallel, spaced-apart relationship so that passages for the passage of air are formed between the plates and in which the insulating frame forms passages for directing the cooling air into and out of the passages between the plates. The frame is moulded from plastic, and the plates are stamped from sheet metal, at low cost. The frame is provided with slits for receiving the edges of the plates so arranged that they and the diodes they support are easily assembled in the frame.

An object of this invention is to facilitate the dissipation of heat from an assembly of series-connected, semiconductor diodes.

Another object of this invention is to provide a structural frame for series-connected, semi-conductor diodes which serves as an electrical insulating support for the diodes, and as an air duct for a cooling air stream.

Another object of this invention is to reduce the manufacturing cost of an assembly of series-connected, semiconductor diodes.

This invention will now be described with reference to the annexed drawings, of which:

FIG. 6 is a fragmentary side view, partially in section of another embodiment of this invention;

FIG. 7 is a section along the line VII—VII of FIG. 6;

FIG. 8 is a section along the line VIII—VIII of FIG. 6;

FIG. 9 is a right-hand end view of FIG. 6; and

FIG. 10 is a fragmentary bottom plan view of the frame of FIGS. 6–9, with the diodes, their supporting plates, and their associated capacitors and resistors omitted.

Figure 1:
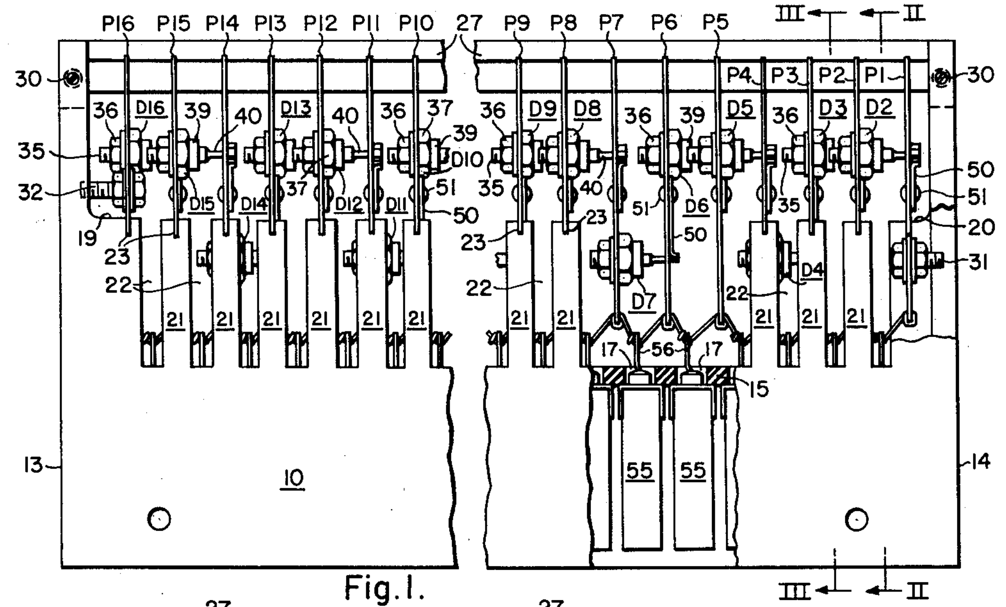
FIGURE 1 is a fragmentary side view, partially in section, of a diode assembly embodying this invention.
Figures 2, 3:
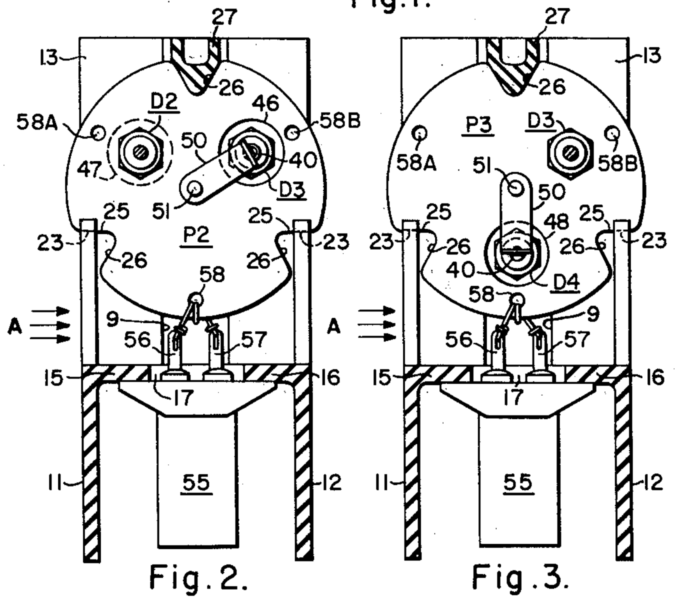
FIG. 2 is a section along the line II—II of FIG. 1.
FIG. 3 is a section along the line III—III of FIG. 1.
Figure 4:
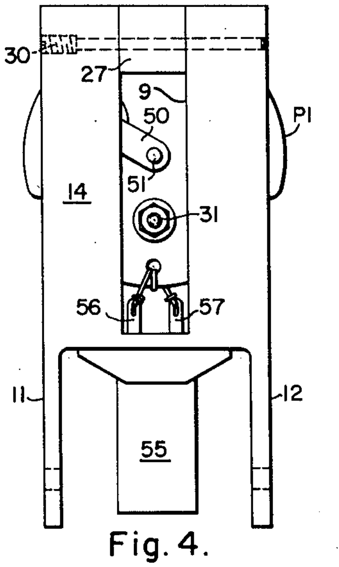
FIG. 4 is a right-hand end view of FIG. 1.

Referring to FIGS. 1–5, a frame 10 of molded plastic has spaced-apart, parallel, vertically extending longitudinal sides 11 and 12, and has ends 13 and 14 with vertically extending slots 9 therein. Part way up from their bottoms, the sides 11 and 12 have spaced-apart, inwardly extending ribs 15 and 16, respectively, with holes 17 between their inner ends. The frame sides 11 and 12 extend to the top of the frame at their ends, and between their ends, are cut away below the top of the frame to form horizontally extending shoulders 19 and 20, respectively, and between the shoulders and above the ribs 15 and 16, respectively, are slotted to form spaced-apart, vertically extending teeth 21, the tops of which are aligned with the shoulders 19 and 20. Between the end portions of the frame sides and the adjacent teeth, and between the teeth are formed air passages 22.

The tops of the shoulders 19 and 20 and of the teeth 21 have transversely extending slits 23 in which are held horizontally extending edges 25 of generally circular metal plates P1—P16. The edges 25 are sides of generally V-shaped recesses 26 in the plates. Each plate has three such recesses with their axes along radial lines 120° apart. The axes of upper recesses 26 are vertically extending, and in such upper recesses is fitted a longitudinally extending bar 27 having a lower surface complemental to the sides of the upper recesses 26. The ends of the bar 27 are secured to the frame ends 13 and 14 by transversely extending screws 30.

The plates P1 and P16 are end plates, the plate P1 having attached thereto a bolt 31 which extends within the slot 9 in the frame end 14, and which serves as the negative terminal of the diode assembly. The plate P16 has attached thereto a bolt 32 which extends within the slot 9 in the frame end 13, and which serves as the positive terminal of the diode assembly.

The plates P2—P16 have extending therethrough threaded positive terminals 35 of semiconductor diodes D2—D16, nuts 36 being threaded onto the terminals 35 to clamp the diodes to the plates. The diodes have nut-shaped bases 37 on the opposite sides of the plates from the terminals 35 for receiving a wrench for holding the diodes against movement while the nuts 36 are tightened. The diodes have insulating sleeves 39 opposite the terminals 35, through which extend negative terminals of the diodes, which are formed as small metal rods 40 with outer ends of reduced diameter.

The diodes D2, D5, D8, D12 and D15 are arranged in longitudinal alignment on one side of the longitudinal axis of the frame, with the diodes D3, D6, D9, D13 and D16 in longitudinal alignment on the opposite side of the longitudinal axis of the frame. The diodes D4, D7, D11 and D14 are arranged below the other diodes, with their axes in a vertical plane extending through the longitudinal axis of the frame.

The plates P2, P5, P8, P12 and P15 have circular clearance openings 46 through which the outer ends of the terminal rods 40 of the diodes D3, D6, D9, D13 and D16, respectively, extend. The plates P1, P4, P7, P11 and P14 have similar clearance openings 47 through which the outer ends of the terminal rods 40 of the diodes D2, D5, D8, D12 and D15, respectively, extend. The plates P3, P6, P10 and P13 have similar clearance openings 48 through which the outer ends of the terminal rods 40 of the diodes D4, D7, D11 and D14, respectively, extend.

Metal straps 50 have corresponding ends which are attached as by rivets 51 to the plates P1—P15 and have U-shaped slots in their other ends which extend around and grip the outer ends of the terminal rods 40 of the diodes D2—D16, for connecting the diodes as by soldering in series.

The clearance openings 46, 47 and 48 and the straps 50 permit the plates with the diodes assembled thereon, to be easily assembled in the frame and connected in series, following which the bar 27 is secured to the ends of the frame for securing the plates in assembled position.

Figure 5:
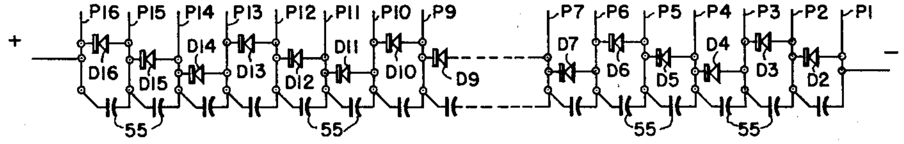
FIG. 5 is a simplified circuit schematic showing the series connections of the diodes and their associated surge restraining capacitors.

Attached to the ribs 15 and 16 below the plates are surge restraining capacitors 55, each having terminals 56 and 57 extending through the frame openings 17 and connected within small circular openings 58 in the plates to the plates, connecting the capacitors across the plates as is shown by FIG. 5. Voltage divider resistors which are not shown could be connected across the capacitors.

Two of the recesses 26 in the plates serve to locate the plates in the slits in the frame, and the other recess 26 in each plate serves to receive the bar 27. Since the recesses are similar, each can be used for the function of another as when the plates are rotated to the right or left from the positions shown. Additional small openings 58A and 58B in the plates, shown unused by the drawings, are provided for receiving capacitor terminals when the plates are rotated from the positions shown.

In operation, the diodes would become heated by the flow of current therethrough, and would heat the plates to which they are attached. Cooling air would be drawn by convection horizontally between the plates as shown by the horizontal arrows A on FIG. 2, and after passing over the entire surfaces of the plates would pass out the open top of the frame. The air passages 22 shown by FIG. 1, permit the cooling air to pass over the lower surfaces of the plates. The frame 10 is, therefore, seen to provide air duct passages as well as an insulating support for the diodes and their capacitors.

Referring now to FIGS. 6–10, the embodiment there shown is designed to be placed over a vertically extending duct which is not shown, and through which cooling air under pressure is supplied. A frame 60 of electrical insulating material has an open top across which extends a removable top plate 61 of electrical insulating material. The plate 61 has slots 62 spaced apart equal distances longitudinally of the plate, and which provide clearance for terminals 63 of capacitors 64 which are supported within casings 65 on the upper surface of the plate 61. The frame has vertically extending ends 66 and 67 and vertically extending sides 68 and 69. The top of the frame has flanges 70 extending outwardly beyond its ends 66 and 67, with a horizontal upper surface in contact with the lower surface of the plate 61. The flanges 70 and plate 61 have circular openings 105 extending therethrough, which are adapted to receive bolts which are not shown, for securing the plate 61 to the frame 60 and for attaching the assembly to a support.

The lower portions of the vertical sides 68 and 69 of the frame 60 are formed by longitudinally spaced-apart, vertically extending teeth 71 with air passages 72 therebetween. Air outlet openings 73 extend from the tops of the teeth 71 to the top plate 61. Between some of the teeth 71, the frame sides have reinforcing portions 74 with tops aligned with the tops of the teeth 71 except at the longitudinal centers of the portions 74 where vertically extending ribs 75 extend to the plate 61. Air passages 76 are formed between the reinforcing portions 74 and the adjacent teeth 71. The teeth 71 have vertically extending slits 78 which receive the lower corner portions of rectangular metal plates P20—P24 and P27—P33. The reinforcing portions 74 have similar slits which receive the lower corner portions of similar metal plates P25 and P26. The top plate 61 of the frame has at the transverse sides of the slots 62 downwardly extending ribs 80 which have transversely extending slits 81 therein which receive the tops of the plates P20—P32.

The plates P20—P33 are similar and are spaced apart equal distances longitudinally of the frame 60. The plates P20 and P33 are end plates, and have attached thereto, terminal bolts 85 and 86, respectively, which are accessible through U-shaped openings 87 in the ends of the frame.

The plates P21—P33 have extending therethrough threaded positive terminals 90 of diodes D21—D33 respectively, nuts 91 being threaded onto the terminals 90 to clamp the diodes to the plates. The diodes have nut-shaped bases 93 on the opposite sides of the plates from the terminals 90, which are adapted to be held in a wrench for holding the diodes against movement while the nuts 91 are tightened. The diodes have insulating sleeves 94 through which extend negative terminal rods 95 which have flattened outer ends 96.

The diodes D21, D25 and D31 have their axes in longitudinal alignment in the upper portions of the plates P21, P25 and P31, respectively, on one side of the longitudinal axis of the frame 60. The diodes D24 and D30 have their axes in longitudinal alignment on the opposite side of the longitudinal axis of the frame, and in transverse alignment with the axes of the diodes D21, D25 and D31. The axes of the diodes D23, D27, D29 and D33 are in longitudinal alignment in the lower portions of the plates P23, P27, P29 and P33, respectively, directly below the axes of the diodes D21, D25 and D31, and the axes of the diodes D22, D26, D28 and D32 are in longitudinal alignment in the lower portions of the plates P22, P26, P28 and P32, respectively, directly below the axes of the diodes D24 and D30.

The plates P20, P24 and P30 have circular clearance openings 97 through which the outer ends of the terminal rods 95 of the diodes D21, D25 and D31, respectively, extend. The plates P23 and P29 have similar clearance openings 98 through which the outer ends of the terminal rods 95 of the diodes D24 and D30, respectively, extend. The plates P22, P26, P28 and P32 have similar clearance openings 99 through which the outer ends of the terminal rods 95 of the plates P23, P27, P29 and P33, respectively, extend. The plates P21, P25 and P31 have similar clearance openings 100 through which the outer ends of the terminal rods 95 of the diodes D22, D26 and D32, respectively, extend.

Metal straps 101 have corresponding ends which are attached as by rivets 102 to the plates P20—P32 and have their other ends attached as by soldering to the flattened outer ends 96 of the terminal rods 95 of the diodes D21—D33 for connecting the diodes in series.

The clearance openings 97, 98, 99 and 100, and the metal straps 101 permit the plates with the diodes assembled thereon to be easily assembled in the frame 60, following which the top plate 61 is bolted to the top of the frame, and the diodes connected in series by the straps 101.

The surge restraining capacitors 64 are connected to the tops of the plates P20—P33 across the diodes D21—D33. Each capacitor is a two-section capacitor having three terminals 63 with the inner terminal common to the two sections. An outer terminal 63 would be connected to one diode plate, the inner terminal 63 would be connected to an adjacent diode plate, and the other outer terminal would be connected to the next adjacent plate.

Voltage divider resistors 104 are connected at their ends to adjacent plates for connecting the resistors in series across the series connected diodes and capacitors.

In the operation of FIGS. 6–10, the diodes D21—D33 would be heated by the passage of current therethrough, and would heat the plates P21—P33 which act as heat dissipating extended surface fins. The frame 60 would be placed over a duct through which cooling air is supplied. This air would pass through the open bottom of the frame 60, then vertically between the plates P20—P33, and would then be deflected horizontally both ways from between the plates P20—P33 by the top plate 61 as shown by the arrows on FIG. 7.

In both the described and illustrated embodiments of this invention, the plates to which the diodes are attached serve as extended surface, heat dissipating fins, and the insulating frames not only support the diode plates so that they are adequately insulated and can be easily and cheaply assembled, but also act as ducts for guiding cooling air between and from the diode supporting plates.

I claim as my invention:

1. A rectifier assembly comprising a frame of electrical insulation having spaced-apart vertically extending sides; said sides being slotted to form a plurality of vertically extending horizontally spaced-apart teeth; said sides having openings above said teeth; said teeth having transversely extending slits therein; metal plates having lower portions supported in said slits; a semiconductor diode having a terminal of one polarity clamping and electrically connecting said diode to each of said plates; the diode on each plate being out of alignment with the diodes on adjacent plates; said diodes having terminals of the opposite polarity extending horizontally towards one end of said frame; each plate having a clearance opening through which a horizontally extending terminal of a diode clamped to an adjacent plate extends, and having means electrically connecting it to the terminal which extends through it.

2. A rectifier assembly comprising a frame of electrical insulation having spaced-apart vertically extending sides and an open top, said sides being slotted to form a plurality of vertically extending horizontally spaced-apart teeth, said sides having openings above said teeth, said teeth having transversely extending slits therein, vertically extending parallel metal plates having lower portions supported in said slits and having upper portions with aligned recesses therein, a bar in said recesses and clamped to the ends of said frame, a semiconductor diode clamped to each of said plates, and means including said plates connecting said diodes electrically in series.

3. A rectifier assembly comprising a frame of electrical insulation having spaced-apart vertically extending sides, and having an open bottom and an open top, said sides being slotted to form a plurality of vertically extending horizontally spaced-apart teeth, said sides having openings above said teeth, said teeth having transversely extending slits therein, metal plates having lower portions supported in said slits, a top plate of electrical insulation over said open top of said frame, said top plate having slits in its lower surface into which upper portions of said metal plates extend, a semiconductor diode clamped to each of said metal plates, and means including said metal plates connecting said diodes electrically in series.

4. A rectifier assembly comprising a frame of electrical insulation having spaced-apart vertically extending sides and having an open top, said sides being slotted to form a plurality of vertically extending horizontally spaced-apart teeth, said sides having openings above said teeth, said teeth having transversely extending slits therein, vertically extending parallel metal plates having lower portions supported in said slits, said frame having a partition extending between said sides below said plates, said partition having horizontally spaced-apart slots therein, a plurality of capacitors supported below said partition and having terminals extending through said slots and connected to said plates, a semiconductor diode clamped to each of said plates, and means including said plates connecting said diodes electrically in series.

5. A rectifier assembly comprising a frame of electrical insulation having spaced-apart vertically extending sides and having an open top, said sides being slotted to form a plurality of vertically extending horizontally spaced-apart teeth, said sides having openings above said teeth, said teeth having transversely extending slits therein, vertically extending parallel metal plates having lower portions supported in said slits and having aligned recesses in their upper portions, a bar in said recesses, said bar being clamped to the ends of said frame, said frame having a partition extending between said sides below said plates, said partition having horizontally spaced-apart slots therein, a plurality of capacitors supported below said partition and having terminals extending through said slots and connected to said plates, a semiconductor diode clamped to each of said plates, and means including said plates connecting said diodes electrically in series.

6. A rectifier assembly comprising a frame of electrical insulation having spaced-apart vertically extending sides and an open top and an open bottom, said sides being slotted to form a plurality of vertically extending horizontally spaced-apart teeth, said sides having openings above said teeth, said teeth having transversely extending slits therein, vertically extending parallel metal plates having lower portions supported in said slits, a top plate of electrical insulation over said open top of said frame, said top plate having slits in its lower surface into which upper portions of said metal plates extend, and having horizontally spaced-apart slots therein, capacitors supported on the upper surface of said top plate and having terminals extending through said slots and connected to said metal plates, a semiconductor diode clamped to each of said plates, and means including said metal plates connecting said diodes electrically in series.

7. A rectifier assembly comprising a frame of electrical insulation having spaced-apart vertically extending sides, and having an open top and an open bottom, said sides being slotted to form a plurality of vertically extending longitudinally spaced-apart teeth, said sides having openings above said teeth, said teeth having transversely extending slits therein, vertically extending parallel metal plates having lower portions supported in said slits, a top plate of electrical insulation over said open top of said frame, said top plate having slits in its lower surface in which upper portions of said metal plates are supported and having horizontally spaced-apart slots therein, capacitors supported on the upper surface of said top plate and having terminals extending through said slots and connected to said metal plates, resistors connected to the bottoms of said metal plates, a semi-conductive diode clamped to each of said metal plates, and means including said metal plates connecting said diodes in series.

References Cited in the file of this patent

UNITED STATES PATENTS

| | | |
|---|---|---|
| 2,349,629 | Lazich | May 23, 1944 |
| 2,684,457 | Lingel | July 20, 1954 |
| 2,702,879 | Wheeler | Feb. 22, 1955 |
| 2,714,694 | Drubig | Aug. 2, 1955 |
| 2,778,977 | Lubkin | Jan. 22, 1957 |
| 2,839,710 | Doucot | June 17, 1958 |